Jan. 23, 1951 H. REDDING 2,539,162
FISHLINE SINKER
Filed Jan. 12, 1946

INVENTOR
Howard Redding
BY
Fred C. Matheny
ATTORNEY

Patented Jan. 23, 1951

2,539,162

UNITED STATES PATENT OFFICE 2,539,162

FISHLINE SINKER

Howard Redding, Seattle, Wash.

Application January 12, 1946, Serial No. 640,871

2 Claims. (Cl. 43—44.95)

This invention relates to fish line sinkers and an object of this invention is to provide simple and efficient means for connecting a fish line sinker with a wire fish line without requiring that the line be threaded through the sinker and in such a manner that the grip of the sinker on the line will be released by the pull of a fish thus leaving the sinker slidable on the line and free to slide down along the line toward the hook.

This makes it possible, in landing a fish, to draw the fish close to the end of a fishing rod without interference from a sinker that is normally secured to the line at a substantial distance such as ten to twenty feet from the hook.

In trolling for salmon and like fish, especially in salt water, it is common practice to use a wire line because a wire line is stronger than a non-metallic line of the same diameter and is therefore less bulky on the reel. Also a wire line has less buoyancy than a non-metallic or soft line and a sinker of predetermined weight will take it deeper in the water.

It is necessary to fasten sinkers to these wire lines at a considerable distance from the hook and it is desirable to vary the weight of these sinkers frequently when fishing. The weight of sinker on a line is usually varied by removing one sinker and replacing it by a sinker of different weight. This makes it desirable that the sinkers should be capable of being applied to, and removed from, the line without detaching the hook or lure from the trailing end of the line.

Another object of the invention is to provide a sinker that grips a wire line by putting a bend in said line or by disaligning parts of said line.

Another object is to provide a sinker which is capable of releasably gripping a wire line and which will also releasably grip a soft and pliable line such as a linen or cotton line.

Another object is to provide a fish line sinker having two spaced apart line guiding members adapted to receive a line without requiring an end portion of the line to be threaded therethrough, and without requiring the hooks or lure to be removed from the end of the line each time the sinker is changed.

Another object is to provide a fish line sinker for use on a wire line, which sinker has two spaced apart line guiding members on its top portion and has a line holding clip secured to a side thereof between said line guiding members but transversely displaced relative to said line guiding members.

Other objects of the invention will be apparent from the following description and accompanying drawings.

In the drawings Fig. 1 is a top plan view of a fish line sinker constructed in accordance with this invention showing a fragment of a wire line therein.

Like reference numerals designate like parts throughout the several views.

Figs. 1 to 5 inclusive show a sinker body 10 of a shape commonly referred to as a "kidney sinker" but which may be of any other desired configuration. When the sinker is in use the larger end of this sinker is usually the trailing or rear end and the smaller end is the forward end.

Figure 2:
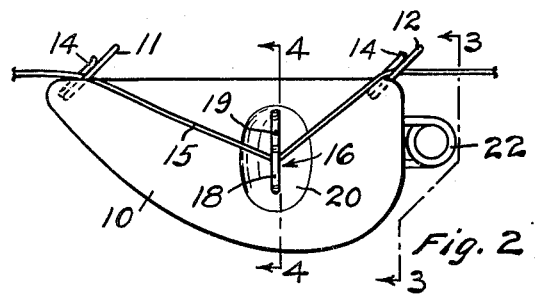
Fig. 2 is a side elevation of the same.
Figure 5:
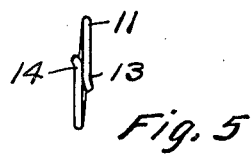
Fig. 5 is a detached edge view of a line guiding clip used on this sinker.

Two line guiding clips 11 and 12, preferably of duplicate construction, are fixedly secured to the sinker body 10 in alignment with each other and near the respective ends of the sinker body 10. One way of securing the clips 11 and 12 to the sinker body 10 is to embed the lower end portions of the clips in the sinker body at the time the body is cast or molded. Preferably these clips 11 and 12 are inclined toward the rear or trailing end of the sinker body, as best shown in Fig. 2, so that they will be less liable to become snagged on rocks, sunken logs and similar obstructions in the water. Each clip 11 and 12 is preferably formed of an oblong loop of resilient wire having two end portions 13 and 14, Fig. 5, that overlap and lie alongside of each other. Preferably each end portion 13 and 14 is bent outwardly a slight amount, as shown in Fig. 5, so that a wire fish line 15 or any other kind of a fish line can be conveniently drawn sidewise into or out of the clip without requiring an end portion of the line to be passed through the clip. Preferably the overlapping end 14 on the upper side of each clip 11 and 12 extends toward the outer end of the clip to minimize the liability of this end catching on obstructions when the sinker is drawn through the water.

The means for gripping and holding the wire line 15 so that the sinker body will be anchored to the wire line 15 and so that the line 15 can not slide through the clips 11 and 12 is in the nature of a hook shaped line holding clip 16 of resilient wire secured to a side of the sinker body between the location of the two line guiding clips 11 and 12 and transversely offset relative to a straight line that passes through the two line guiding clips. Preferably the line holding clip 16 has a portion 17 that is embedded in the sinker body, and has a lower loop portion 18 and also has two parallel shank portions 19 that lie close to each other for a substantial distance so as to provide a passageway of less width than the diameter of the line 15 that is to be passed between said shank portion 19 into and out of the loop 18. The upper end portion or tip of the clip 16 is bent outwardly a slight amount to facilitate insertion of a fish line 15. Preferably the side of the sinker body 15 has a depressed portion or recess 20 wherein the clip 16 is positioned so that the clip 16 will be shielded and will not project substantially beyond the outline of the external surface of the sinker body.

When a wire line 15 is held by the clip 16 a V shaped bend is formed in said wire line 15 and this bend helps to prevent the sinker from sliding along the line.

Figure 4:
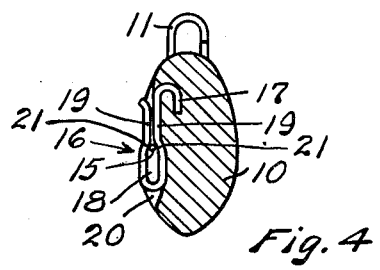
Fig. 4 is a sectional view taken substantially on broken line 4—4 of Fig. 2.

The portion of the wire line 15 within the holding clip 16 is held within the loop portion 18, see Fig. 4, below but not between the parallel shank portions 19. Thus the wire line 15 is not frictionally gripped between the two shank portions 19 but rests against inclined or convergent surfaces 21 of the clip 16 and must press against these surfaces 21 hard enough to spring the two shank portions 19 apart before said line can escape from the holding clip 16. The two parallel shank portions 19 are useful and practical for the purpose of frictionally gripping and releasably holding a soft line, such as a linen or cotton line, but are not practical for use in gripping a wire line as they will not grip a wire line tight enough to efficiently hold it under conditions of use.

Figure 1:
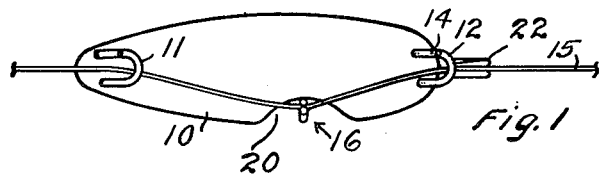
Figure 3:
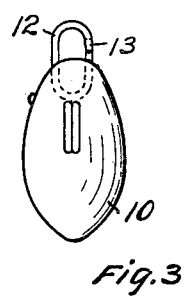
Fig. 3 is an end elevation looking in the direction of broken line 3—3 of Fig. 2.

When a fish is hooked and exerts a sharp pull or jerk on the trailing portion of the line 15 that extends to the right in Figs. 1 and 2, the line 15 will be snapped out of the clip 16 and the sinker will be free to run down the line toward the hook. After the sinker has moved down the line close to the hook it will be a greater impediment to the fish and a less impediment to the fisherman who is seeking to land the fish than said sinker would be in its initial position on the line. Also the sinker will not be in the way of the end of the fishing rod and the fish can be reeled in close to the end of the rod without requiring the fisherman to give any attention to the sinker.

A coiled wire spring friction clip 22 of conventional type is preferably provided on the rear or trailing end portion of the sinker body 10 for use in holding a soft line, such as a linen or cotton line. This clip 22 is not practical for the purpose of holding a wire line as a wire will easily slip out of this clip. When this sinker is used on a soft line the soft line can be frictionally held between the parallel portions 19 of the holding clip 16 and left free of the clip 22, or said soft line can be held in the clip 22 and left free of the clip 16 or said soft line can be frictionally held by both the clip 22 and the parallel portions 19 of the holding clip 16. Thus the sinker may be secured to the soft line so that different amounts of force will be required to free the sinker on the line.

Figure 6:
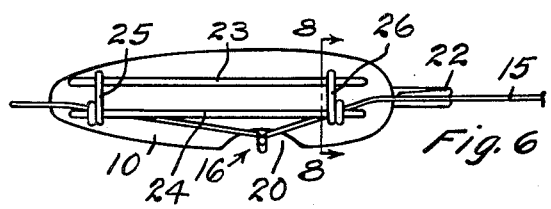
Fig. 6 is a top plan view of a modified form of the invention.
Figure 8:
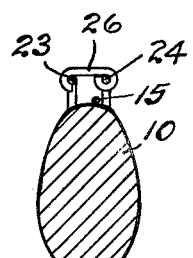
Fig. 8 is a sectional view taken on broken line 8—8 of Fig. 6 and showing parts in elevation.
Figure 7:
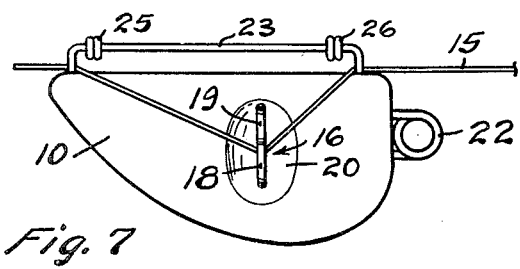
Fig. 7 is a side elevation of the sinker shown in Fig. 6.

All parts of the sinker shown in Figs. 6, 7, and 8, except the line guiding means, are similar to parts shown in Figs. 1 to 4 and like parts are similarly numbered. The line guiding means of Figs. 6, 7 and 8 comprises two longitudinally extending, parallel, spaced apart, resilient bars 23 and 24 having their end portions bent at right angles and secured to the sinker body. Two hooks 25 and 26 cooperate with bars 23 and 24 and are longitudinally and rotatively movable on one of said bars, such as bar 24. When the hooks 25 and 26 are positioned approximately midway between the two ends of the bars 23 and 24 and the medial portions of said bars 23 and 24 are sprung or bowed toward each other, as by pinching them together, then the hooks 25 and 26 can be engaged with or disengaged from the bar 23. When the hooks are disengaged from the bar 23 the line 15 can be positioned between the bars 23 and 24 or removed therefrom. If the line 15 is positioned between these bars 23 and 24 and the hooks 25 and 26 are then engaged with the bar 23 and moved outwardly to positions near the ends of the bars 23 and 24 these hooks 25 and 26 and the end portions of the bars 23 and 24 will cooperate to form two spaced apart line guides near the respective ends of the sinker body 10.

The operation of the sinker shown in Figs. 6, 7 and 8, as respects releasably gripping either a wire fish line or a soft fish line, is similar to the operation of the sinker shown in Figs. 1 to 5. Both types of sinker herein disclosed can be quickly and easily applied to or removed from a line without detaching the hooks or lure from the line and without passing an end portion of the line through the line guides. Also both types of sinker herein disclosed will be released on the line when a fish becomes hooked and will run down along the line to a location adjacent the hook.

I have herein disclosed preferred embodiments of my invention but it will be understood that changes therein may be made within the scope and spirit of the following claims.

I claim:

1. A fish line sinker for releasably holding a wire line, comprising a sinker body; spaced apart fish line guiding devices provided adjacent the respective ends of said sinker body; and a resilient line holding clip secured to a side of said sinker body between said line guiding devices and in a position transversely offset relative to a straight line passing through said fish line guiding devices, said resilient clip having a line receiving jaw a portion of which is of less width than the diameter of a wire fish line and said jaw having a line receiving opening directed toward a straight line passing through said fish line guiding devices, whereby when a wire fish line is guided in said line guiding devices a portion of said line between said line guiding devices can be deflected sidewise in a bend and drawn into said resilient line holding clip and will be releasably held by said clip in a position from which it can be released by the exertion of a substantial pull tending to straighten the portion of the line between the line guiding devices.

2. A fish line sinker for releasable attachment to wire fish lines and pliable fish lines, comprising a sinker body of oval cross section and of greater length than width; spaced apart fish line guiding devices provided on the upper edge portion of said sinker body adjacent the respective ends thereof; and a hook shaped resilient line holding clip secured to a side of the sinker body and extending generally crosswise of the sinker body between said line guiding devices, said hook shaped line holding clip being transversely offset relative to a straight line passing through said fish line guiding devices, said resilient clip having a line receiving jaw provided with parallel portions spaced apart a distance less than the diameter of the fish line to be held, said parallel portions being divergent at their upper ends to provide an upwardly directed line entrance opening and said parallel portions being connected at their lower ends by a loop portion of greater width than the parallel portions, whereby when a fish line is guided in said line guiding devices a portion of said line between said line guiding devices can be deflected downwardly in a bend and drawn into said line receiving clip to be releasably held thereby in a position from which it can be released by a substantial pull which tends to straighten the line, the parallel portions providing for the gripping of a pliable line and the loop portion providing for the releasable holding of a wire line.

HOWARD REDDING.

REFERENCES CITED

The following references are of record in the file of this patent:

UNITED STATES PATENTS

| Number | Name | Date |
|---|---|---|
| 118,772 | Camp | Sept. 5, 1871 |
| 631,197 | Bourke | Aug. 15, 1899 |
| 942,597 | Teasdale | Dec. 7, 1909 |
| 978,519 | Vaugn | Dec. 13, 1910 |
| 2,135,847 | Rosenquist | Nov. 8, 1938 |
| 2,399,298 | Sevegny | Apr. 30, 1946 |

FOREIGN PATENTS

| Number | Country | Date |
|---|---|---|
| 21,433 | Great Britain | 1892 |
| 361,078 | Great Britain | Nov. 19, 1931 |